(12) United States Patent
Deshpande

(10) Patent No.: US 12,279,004 B2
(45) Date of Patent: Apr. 15, 2025

(54) SYSTEMS AND METHODS FOR SIGNALING CONTENT COMPONENT INFORMATION IN OMNIDIRECTIONAL MEDIA

(71) Applicant: SHARP KABUSHIKI KAISHA, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/215,234

(22) Filed: Jun. 28, 2023

(65) Prior Publication Data

US 2023/0421828 A1 Dec. 28, 2023

Related U.S. Application Data

(60) Provisional application No. 63/356,347, filed on Jun. 28, 2022.

(51) Int. Cl.
*H04N 21/262* (2011.01)
(52) U.S. Cl.
CPC .................. *H04N 21/262* (2013.01)
(58) Field of Classification Search
CPC ................................................ H04N 21/262
See application file for complete search history.

(56) References Cited

U.S. PATENT DOCUMENTS

2023/0132473 A1\* 5/2023 Lee ...................... H04N 13/351
382/154

\* cited by examiner

*Primary Examiner* — Nicholas T Corbo
(74) *Attorney, Agent, or Firm* — ScienBiziP, P.C.

(57) ABSTRACT

A device includes one or more processors configured to: receive a representation element; and parse an attribute in the representation element, wherein the attribute, when present, specifies a set of media content components that are contained in the representation element as a list of track identifier values, and the attribute is represented as a list of unsigned integers.

3 Claims, 10 Drawing Sheets

SYSTEMS AND METHODS FOR SIGNALING CONTENT COMPONENT INFORMATION IN OMNIDIRECTIONAL MEDIA

The present application claims the benefit of priority to U.S. provisional Patent Application No. 63/356,347, filed on Jun. 28, 2022, entitled "SYSTEMS AND METHODS FOR SIGNALING CONTENT COMPONENT INFORMATION IN OMNIDIRECTIONAL MEDIA". The contents of U.S. provisional Patent Application No. 63/356,347 are fully incorporated herein by reference for all purposes.

TECHNICAL FIELD

This disclosure relates to the field of interactive video distribution and more particularly to techniques for signaling content component information in a virtual reality application.

BACKGROUND

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular phones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packet-switched networks, including bidirectional networks, such as Internet Protocol (IP) networks and unidirectional networks, such as digital broadcast networks.

Digital video included in digital media content may be coded according to a video coding standard. Video coding standards may incorporate video compression techniques. Examples of video coding standards include ISO/IEC MPEG-4 Visual and ITU-T H.264 (also known as ISO/IEC MPEG-4 AVC), High-Efficiency Video Coding (HEVC), and Versatile Video Coding (VVC). Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Prediction coding techniques may be used to generate difference values between a unit of video data to be coded and a reference unit of video data. The difference values may be referred to as residual data. Residual data may be coded as quantized transform coefficients. Syntax elements may relate residual data and a reference coding unit. Residual data and syntax elements may be included in a compliant bitstream. Compliant bitstreams and associated metadata may be formatted according to data structures. Compliant bitstreams and associated metadata may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 3.0 suite of standards.

SUMMARY

In general, this disclosure describes various techniques for signaling content component information. It should be noted that although in some examples, the techniques of this disclosure are described with respect to transmission standards, the techniques described herein may be generally applicable. For example, the techniques described herein are generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband Television (HbbTV) standards, World Wide Web Consortium (W3C) standards, and Universal Plug and Play (UPnP) standard. Further, it should be noted that although techniques of this disclosure are described with respect to ITU-T H.264, ITU-T H.265, and ITU-T H.266. the techniques of this disclosure are generally applicable to video coding, including omnidirectional video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 or ITU-T H.266. Thus, reference to ITU-T H.264, ITU-T H.265, or ITU-T H.266 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a device includes one or more processors configured to: receive a representation element; and parse an attribute in the representation element, wherein the attribute, when present, specifies a set of media content components that are contained in the representation element as a list of track identifier values, and the attribute is represented as a list of unsigned integers.

In one example, a device of signaling information associated with an omnidirectional video, the device includes: a processor, and a memory associated with the processor; wherein the processor is configured to: signal a representation element, wherein the representation element includes the attribute, when present, specifying a set of media content components that are contained in the representation element as a list of track identifier values, and the attribute is represented as a list of unsigned integers.

In one example, a method of providing omnidirectional video, the method includes: receiving a representation element; and parsing an attribute in the representation element, wherein the attribute, when present, specifies a set of media content components that are contained in the representation element as a list of track identifier values, and the attribute is represented as a list of unsigned integers.

The details of one or more examples are set forth in the accompanying drawings and the description below. Other features, objects, and advantages will be apparent from the description and drawings, and from the claims.

DETAILED DESCRIPTION

Figure 1:
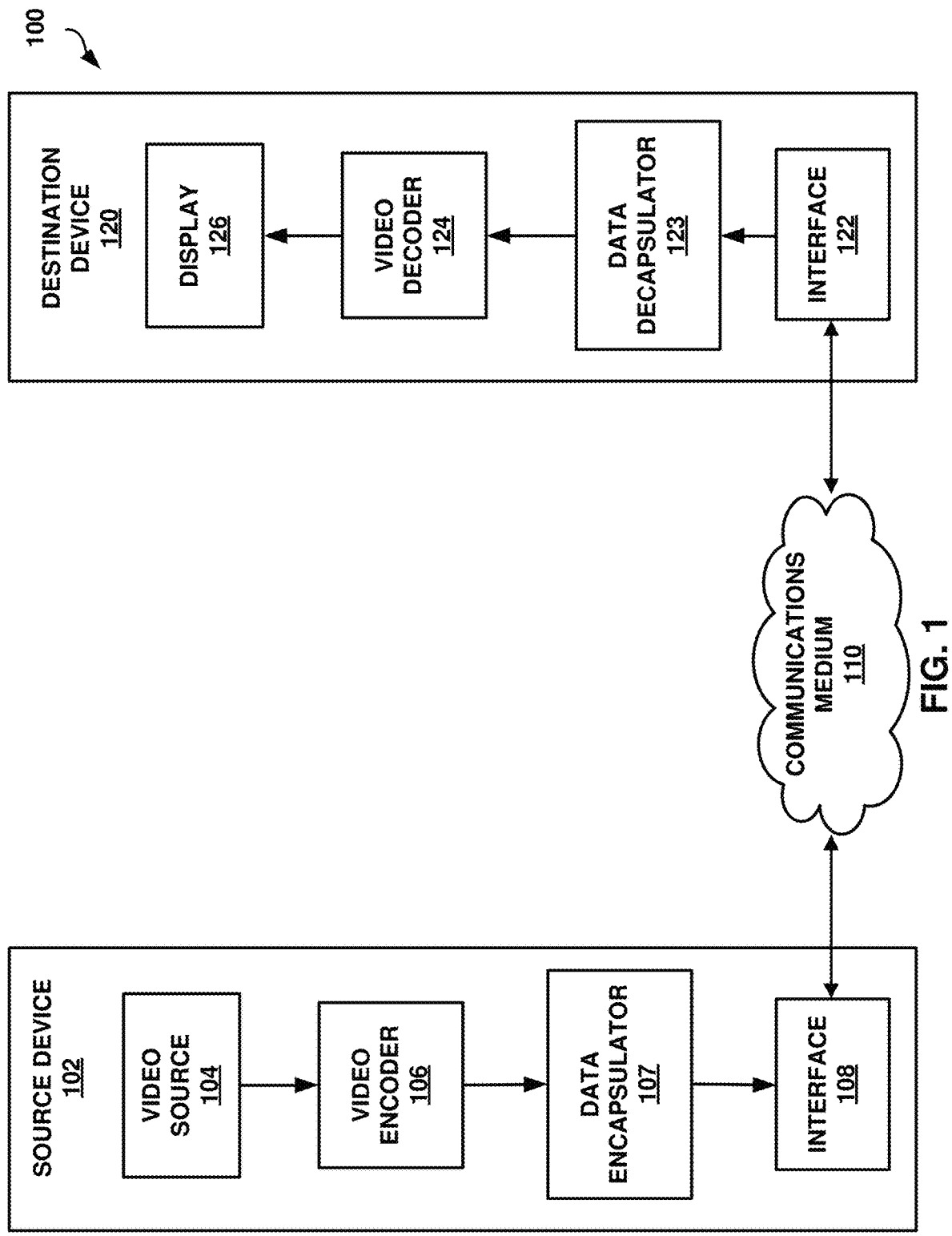
FIG. 1 is a block diagram illustrating an example of a system that may be configured to transmit coded video data according to one or more techniques of this disclosure.

Video content typically includes video sequences comprised of a series of frames. A series of frames may also be referred to as a group of pictures (GOP). Each video frame or picture may include a one or more slices, where a slice includes a plurality of video blocks. A video block may be defined as the largest array of pixel values (also referred to as samples) that may be predictively coded. Video blocks may be ordered according to a scan pattern (e.g., a raster scan). A video encoder performs predictive encoding on video blocks and sub-divisions thereof. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. ITU-T H.266 specifies where CTUs are partitioned according a quadtree plus multi-type tree (QTMT or QT+MTT) structure. As used herein, the term video block may generally refer to an area of a picture or may more specifically refer to the largest array of pixel values that may be predictively coded, sub-divisions thereof, and/or corresponding structures. According to ITU-T H.265, each video frame or picture may be partitioned to include one or more tiles, where a tile is a sequence of coding tree units corresponding to a rectangular area of a picture. In ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. In ITU-T H.266 a slice is required to consist of an integer number of complete tiles or an integer number of consecutive complete CTU rows within a tile, instead of only being required to consist of an integer number of CTUs.

In ITU-T H.265, the CTBs of a CTU may be partitioned into Coding Blocks (CB) according to a corresponding quadtree block structure. According to ITU-T H.265, one luma CB together with two corresponding chroma CBs and associated syntax elements are referred to as a coding unit (CU). A CU is associated with a prediction unit (PU) structure defining one or more prediction units (PU) for the CU, where a PU is associated with corresponding reference samples. That is, in ITU-T H.265 the decision to code a picture area using intra prediction or inter prediction is made at the CU level and for a CU one or more predictions corresponding to intra prediction or inter prediction may be used to generate reference samples for CBs of the CU. In ITU-T H.266, CTUs are partitioned according a quadtree plus multi-type tree (QTMT or QT+MTT) structure. Intra prediction data (e.g., intra prediction mode syntax elements) or inter prediction data (e.g., motion data syntax elements) may associate areas of picture with corresponding reference samples. Residual data may include respective arrays of difference values corresponding to each component of video data (e.g., luma (Y) and chroma (Cb and Cr)). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted an array of pixel difference values may be sub-divided for purposes of generating transform coefficients, such sub-divisions may be referred to as Transform Blocks (TBs). Transform coefficients may be quantized according to a quantization parameter (QP). Quantized transform coefficients (which may be referred to as level values) may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins."

Virtual Reality (VR) applications may include video content that may be rendered with a head-mounted display, where only the area of the spherical video that corresponds to the orientation of the user's head is rendered. VR applications may be enabled by omnidirectional video, which is also referred to as 360 degree spherical video of 360 degree video. Omnidirectional video is typically captured by multiple cameras that cover up to 360 degrees of a scene. A distinct feature of omnidirectional video compared to normal video is that, typically only a subset of the entire captured video region is displayed, i.e., the area corresponding to the current user's field of view (FOV) is displayed. A FOV is sometimes also referred to as viewport. In other cases, a viewport may be described as part of the spherical video that is currently displayed and viewed by the user. It should be noted that the size of the viewport can be smaller than or equal to the field of view. Further, it should be noted that omnidirectional video may be captured using monoscopic or stereoscopic cameras. Monoscopic cameras may include cameras that capture a single view of an object.

Stereoscopic cameras may include cameras that capture multiple views of the same object (e.g., views are captured using two lenses at slightly different angles). It should be noted that in some cases, the center point of a viewport may be referred to as a viewpoint. However, as used herein, the term viewpoint when associated with a camera (e.g., camera viewpoint), may refer to information associated with a camera used to capture a view(s) of an object (e.g., camera parameters). Further, it should be noted that in some cases, images for use in omnidirectional video applications may be captured using ultra wide-angle lens (i.e., so-called fisheye lens). In any case, the process for creating 360 degree spherical video may be generally described as stitching together input images and projecting the stitched together input images onto a three-dimensional structure (e.g., a sphere or cube), which may result in so-called projected frames. Further, in some cases, regions of projected frames may be transformed, resized, and relocated, which may result in a so-called packed frame.

Transmission systems may be configured to transmit omnidirectional video to one or more computing devices. Computing devices and/or transmission systems may be based on models including one or more abstraction layers, where data at each abstraction layer is represented according to particular structures, e.g., packet structures, modulation schemes, etc. An example of a model including defined abstraction layers is the so-called Open Systems Interconnection (OSI) model. The OSI model defines a 7-layer stack model, including an application layer, a presentation layer, a session layer, a transport layer, a network layer, a data link layer, and a physical layer. It should be noted that the use of the terms upper and lower with respect to describing the layers in a stack model may be based on the application layer being the uppermost layer and the physical layer being the lowermost layer. Further, in some cases, the term "Layer 1" or "L1" may be used to refer to a physical layer, the term "Layer 2" or "L2" may be used to refer to a link layer, and the term "Layer 3" or "L3" or "IP layer" may be used to refer to the network layer.

A physical layer may generally refer to a layer at which electrical signals form digital data. For example, a physical layer may refer to a layer that defines how modulated radio frequency (RF) symbols form a frame of digital data. A data link layer, which may also be referred to as a link layer, may refer to an abstraction used prior to physical layer processing at a sending side and after physical layer reception at a receiving side. As used herein, a link layer may refer to an abstraction used to transport data from a network layer to a physical layer at a sending side and used to transport data from a physical layer to a network layer at a receiving side. It should be noted that a sending side and a receiving side are logical roles and a single device may operate as both a sending side in one instance and as a receiving side in another instance. A link layer may abstract various types of data (e.g., video, audio, or application files) encapsulated in particular packet types (e.g., Motion Picture Expert Group-Transport Stream (MPEG-TS) packets, Internet Protocol Version 4 (IPv4) packets, etc.) into a single generic format for processing by a physical layer. A network layer may generally refer to a layer at which logical addressing occurs. That is, a network layer may generally provide addressing information (e.g., Internet Protocol (IP) addresses) such that data packets can be delivered to a particular node (e.g., a computing device) within a network. As used herein, the term network layer may refer to a layer above a link layer and/or a layer having data in a structure such that it may be received for link layer processing. Each of a transport layer, a session layer, a presentation layer, and an application layer may define how data is delivered for use by a user application.

ISO/IEC JTC1/SC29/WG11 MDS19786_WG03_N00072 "Text of ISO/IEC FDIS 23090-2 2nd edition OMAF," October 2020, is incorporated by reference and referred to herein as N19786 defines a media application format that enables omnidirectional media applications. N19786 specifies a coordinate system for omnidirectional video; projection and rectangular region-wise packing methods that may be used for conversion of a spherical video sequence or image into a two-dimensional rectangular video sequence or image, respectively; storage of omnidirectional media and the associated metadata using the ISO Base Media File Format (ISOBMFF); encapsulation, signaling, and streaming of omnidirectional media in a media streaming system; and media profiles and presentation profiles. It should be noted that for the sake of brevity, a complete description of N19786 is not provided herein. However, reference is made to relevant sections of N19786.

Figure 2A:
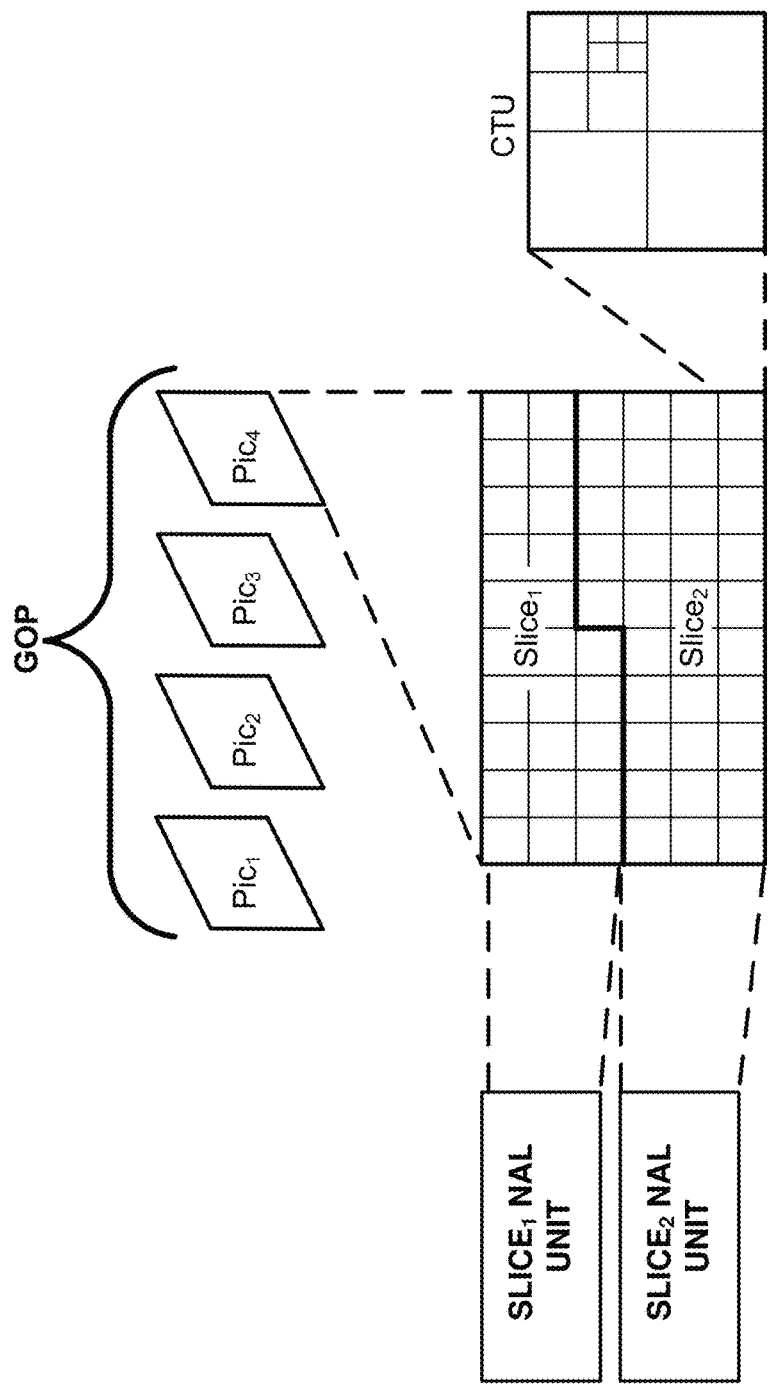
FIGS. 2A-2B are conceptual diagrams illustrating coded video data and corresponding data structures according to one or more techniques of this disclosure.
Figure 2B:
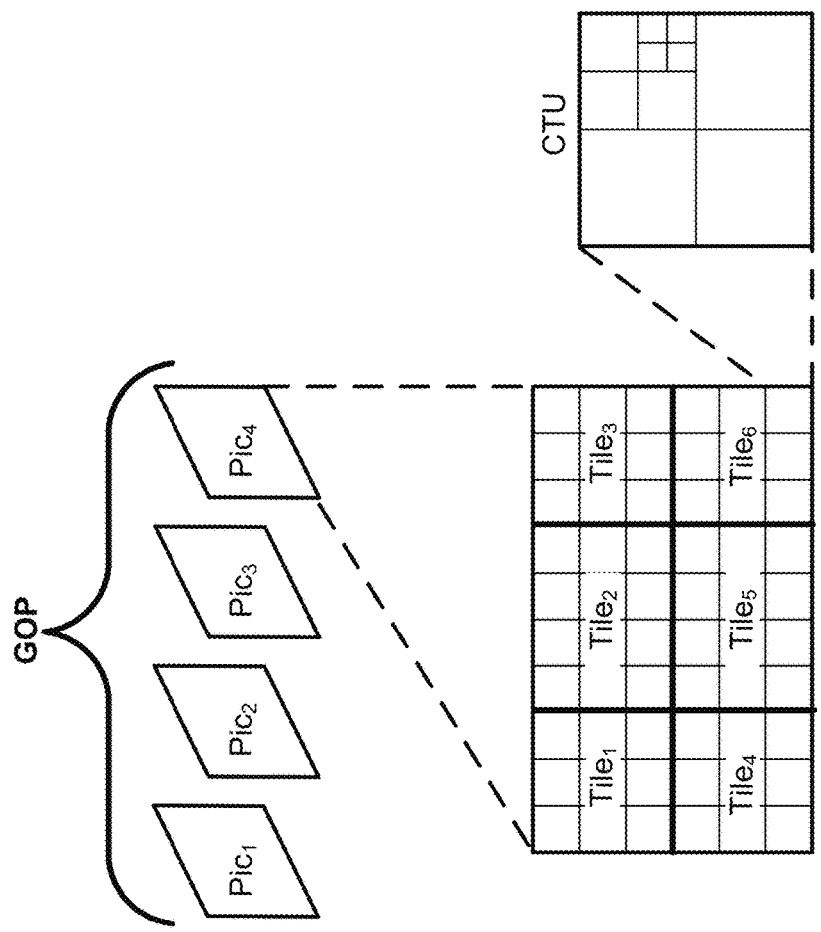

N19786 provides media profiles where video is coded according to ITU-T H.265. ITU-T H.265 is described in High Efficiency Video Coding (HEVC), Rec. ITU-T H.265 December 2016, which is incorporated by reference, and referred to herein as ITU-T H.265. As described above, according to ITU-T H.265, each video frame or picture may be partitioned to include one or more slices and further partitioned to include one or more tiles. FIGS. 2A-2B are conceptual diagrams illustrating an example of a group of pictures including slices and further partitioning pictures into tiles. In the example illustrated in FIG. 2A, $Pic_4$ is illustrated as including two slices (i.e., $Slice_1$ and $Slice_2$) where each slice includes a sequence of CTUs (e.g., in raster scan order). In the example illustrated in FIG. 2B, $Pic_4$ is illustrated as including six tiles (i.e., $Tile_1$ to $Tile_6$), where each tile is rectangular and includes a sequence of CTUs. As provided above, in ITU-T H.265, a tile may consist of coding tree units contained in more than one slice and a slice may consist of coding tree units contained in more than one tile.

Figure 3:
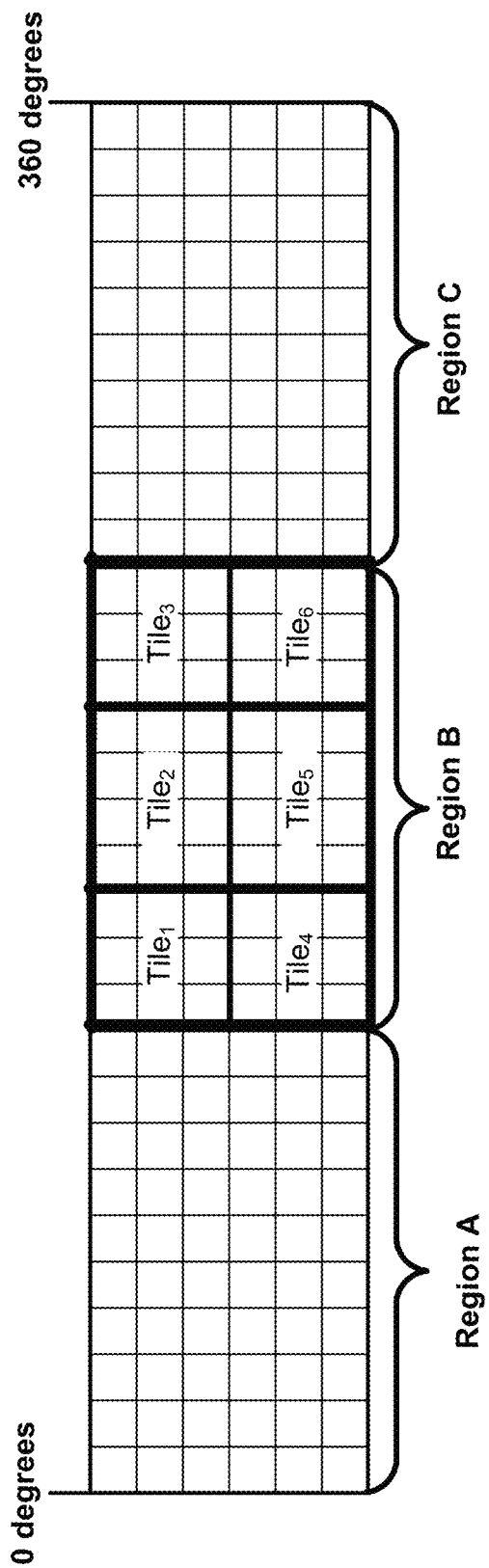
FIG. 3 is a conceptual diagram illustrating coded video data and corresponding data structures according to one or more techniques of this disclosure.

360 degree spherical video may include regions. Referring to the example illustrated in FIG. 3, the 360 degree spherical video includes Regions A, B, and C and as illustrated in FIG. 3, tiles (i.e., $Tile_1$ to $Tile_6$) may form a region of an omnidirectional video. In the example illustrated in FIG. 3, each of the regions are illustrated as including CTUs. As described above, CTUs may form slices of coded video data and/or tiles of video data. Further, as described above, video coding techniques may code areas of a picture according to video blocks, sub-divisions thereof, and/or corresponding structures and it should be noted that video coding techniques enable video coding parameters to be adjusted at various levels of a video coding structure, e.g., adjusted for slices, tiles, video blocks, and/or at sub-divisions. In one example, the 360 degree video illustrated in FIG. 3 may represent a sporting event where Region A and Region C include views of the stands of a stadium and Regions B includes a view of the playing field (e.g., the video is captured by a 360 degree camera placed at the 50-yard line).

As described above, a viewport may be part of the spherical video that is currently displayed and viewed by the user. As such, regions of omnidirectional video may be selectively delivered depending on the user's viewport, i.e., viewport-dependent delivery may be enabled in omnidirectional video streaming. Typically, to enable viewport-dependent delivery, source content is split into sub-picture sequences before encoding, where each sub-picture sequence covers a subset of the spatial area of the omnidirectional video content, and sub-picture sequences are then encoded independently from each other as a single-layer bitstream. For example, referring to FIG. 3, each of Region A, Region B, and Region C, or portions thereof, may correspond to independently coded sub-picture bitstreams. Each sub-picture bitstream may be encapsulated in a file as its own track and tracks may be selectively delivered to a receiver device based on viewport information. It should be noted that in some cases, it is possible that sub-pictures overlap. For example, referring to FIG. 3, $Tile_1$, $Tile_2$, $Tile_4$, and $Tile_5$ may form a sub-picture and $Tile_2$, $Tile_3$, $Tile_5$, and $Tile_6$ may form a sub-picture. Thus, a particular sample may be included in multiple sub-pictures. N19786 provides where a composition-aligned sample includes one of a sample in a track that is associated with another track, the sample has the same composition time as a particular sample in the another track, or, when a sample with the same composition time is not available in the another track, the closest preceding composition time relative to that of a particular sample in the another track. Further, N19786 provides where a constituent picture includes part of a spatially frame-packed stereoscopic picture that corresponds to one view, or a picture itself when frame packing is not in use or the temporal interleaving frame packing arrangement is in use.

Figure 4:
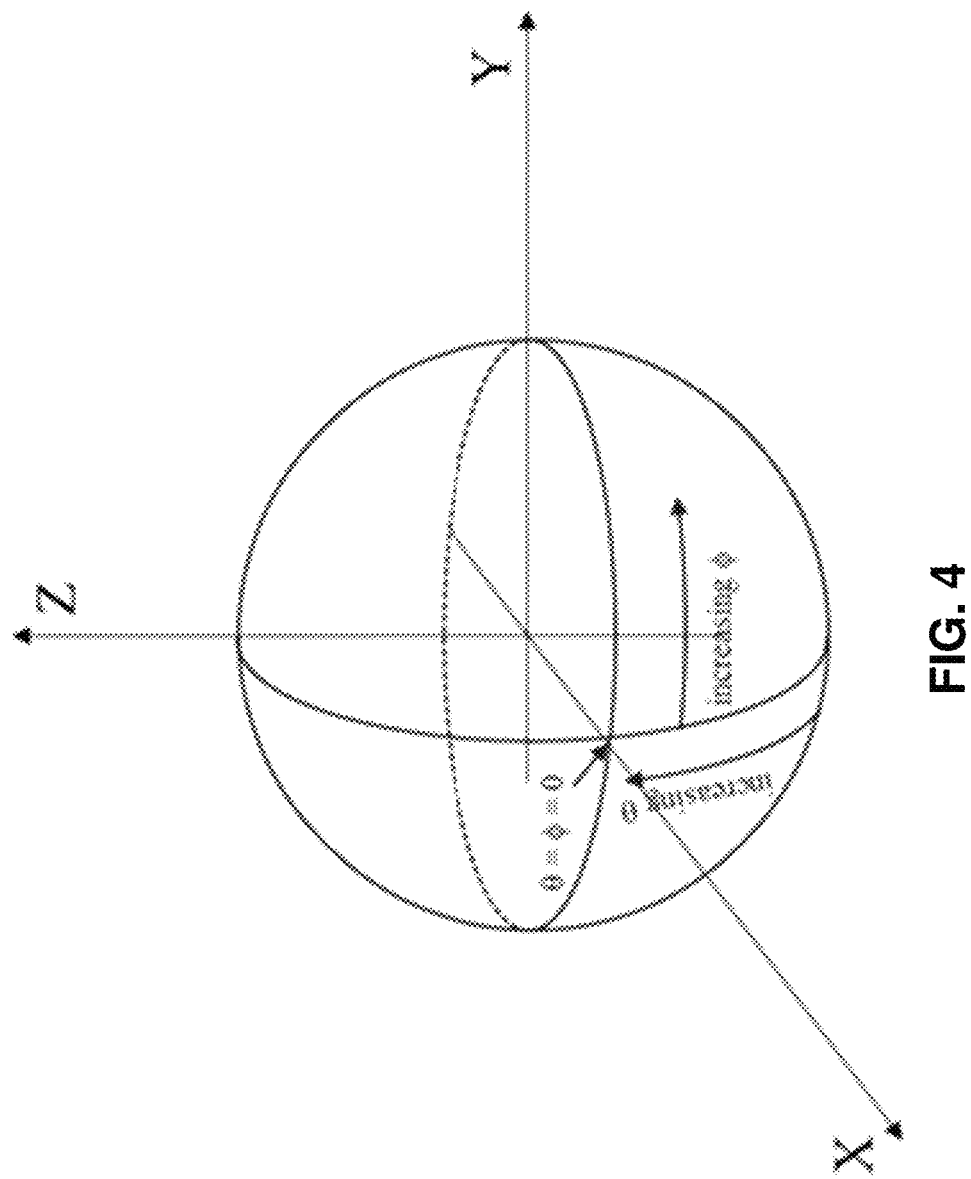
FIG. 4 is a conceptual diagram illustrating an example of a coordinate system according to one or more techniques of this disclosure.

As described above, N19786 specifies a coordinate system for omnidirectional video. In N19786, the coordinate system consists of a unit sphere and three coordinate axes, namely the X (back-to-front) axis, the Y (lateral, side-to-side) axis, and the Z (vertical, up) axis, where the three axes cross at the center of the sphere. The location of a point on the sphere is identified by a pair of sphere coordinates azimuth ($\phi$) and elevation ($\theta$). FIG. 4 illustrates the relation of the sphere coordinates azimuth ($\phi$) and elevation ($\theta$) to the X, Y, and Z coordinate axes as specified in N19786. It should be noted that in N19786 the value ranges of azimuth is −180.0, inclusive, to 180.0, exclusive, degrees and the value range of elevation is −90.0 to 90.0, inclusive, degrees. N19786 specifies where a region on a sphere may be specified by four great circles, where a great circle (also referred to as a Riemannian circle) is an intersection of the sphere and a plane that passes through the center point of the sphere, where the center of the sphere and the center of a great circle are co-located. N19786 further describes where a region on a sphere may be specified by two azimuth circles and two elevation circles, where a azimuth circle is a circle on the sphere connecting all points with the same azimuth value, and an elevation circle is a circle on the sphere connecting all points with the same elevation value. The sphere region structure in N19786 forms the basis for signaling various types of metadata. In particular, in N19786, a sphere region structure (SphereRegionStruct) specifies a sphere region. The sphere region structure defines a sphere region by defining parameters centre_azimuth, centre_elevation, centre_tilt with optional inclusion of azimuth_range and elevation_range, (and optional inclusion of an interpolation indication). The sphere region sample metadata in turn is used to define initial viewing orientation and recommended viewport information. Additionally, the sphere region structure forms the basis of DASH descriptor signaling for content coverage descriptor, spherical region-wise quality ranking descriptor. Similarly, the sphere region structure forms the basis of VRROIGuide MMT message.

It should be noted that with respect to the equations used herein, the following arithmetic operators may be used:
☐ Addition
− Subtraction (as a two-argument operator) or negation (as a unary prefix operator)
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
☐ Used to denote division in mathematical equations where no truncation or rounding is intended.

$$\frac{x}{y}$$

Used to denote division in mathematical equations where no truncation or rounding is intended.
x % y Modulus. Remainder of x divided by y, defined only for integers x and y with
x>=0 and y>0.
It should be noted that with respect to the equations used herein, the following logical operators may be used:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.
It should be noted that with respect to the equations used herein, the following relational operators may be used:
> Greater than
☐☐ Greater than or equal to
< Less than
☐☐ Less than or equal to
☐☐ Equal to
!☐ Not equal to
It should be noted in the syntax used herein, unsigned int(n) refers to an unsigned integer having n-bits. Further, bit(n) refers to a bit value having n-bits.

As described above, the sphere region structure in N19786 forms the basis for signaling various types of metadata. In particular, N19786 includes a sphere region structure specifying a sphere region having the following definition, syntax, and semantics:

Definition

The sphere region structure (SphereRegionStruct) specifies a sphere region.
When centre_tilt is equal to 0, the sphere region specified by this structure is derived as follows:
If both azimuth_range and elevation_range are equal to 0, the sphere region specified by this structure is a point on a spherical surface.
Otherwise, the sphere region is defined using variables centreAzimuth, centreElevation, cAzimuth1, cAzimuth, cElevation1, and cElevation2 derived as follows:

centreAzimuth=centre_azimuth÷65536 centreElevation=centre_elevation÷65536 cAzimuth1=(centre_azimuth−azimuth_range÷2)÷65536

$$cAzimuth2 = (centre\_azimuth + azimuth\_range \div 2) + 65536$$

$$cElevation1 = (centre\_elevation - elevation\_range \div 2) + 65536$$

$$cElevation2 = (centre\_elevation + elevation\_range \div 2) + 65536$$

Figure 5A:
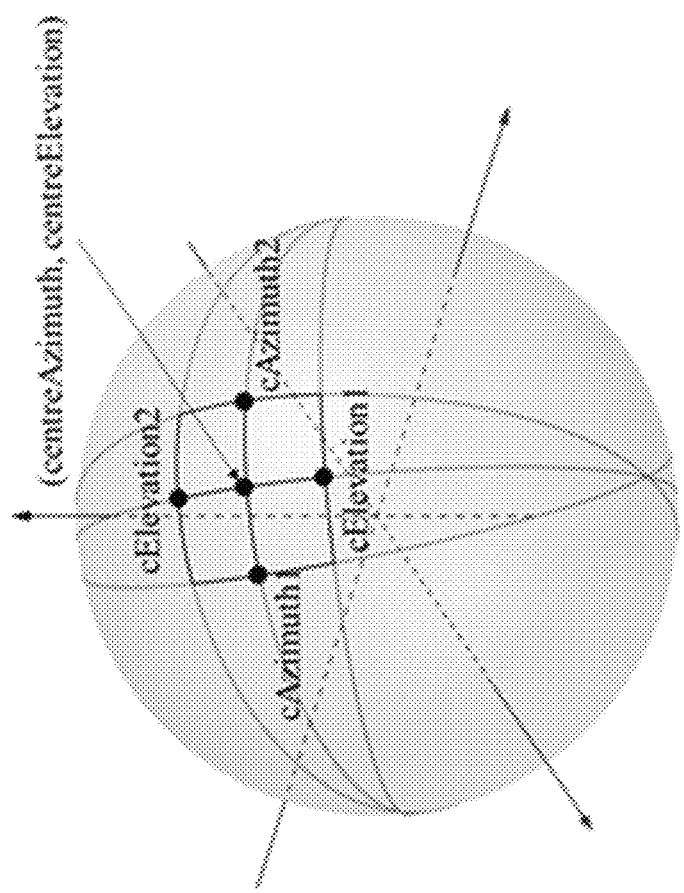
FIGS. 5A-5B are conceptual diagrams illustrating examples of specifying regions on a sphere according to one or more techniques of this disclosure.

The sphere region is defined as follows with reference to the shape type value specified in the semantics of the structure containing this instance of SphereRegionStruct:

When the shape type value is equal to 0, the sphere region is specified by four great circles defined by four points cAzimuth1, cAzimuth2, cElevation1, cElevation2 and the centre point defined by centreAzimuth and centreElevation and as shown in FIG. 5A.

Figure 5B:
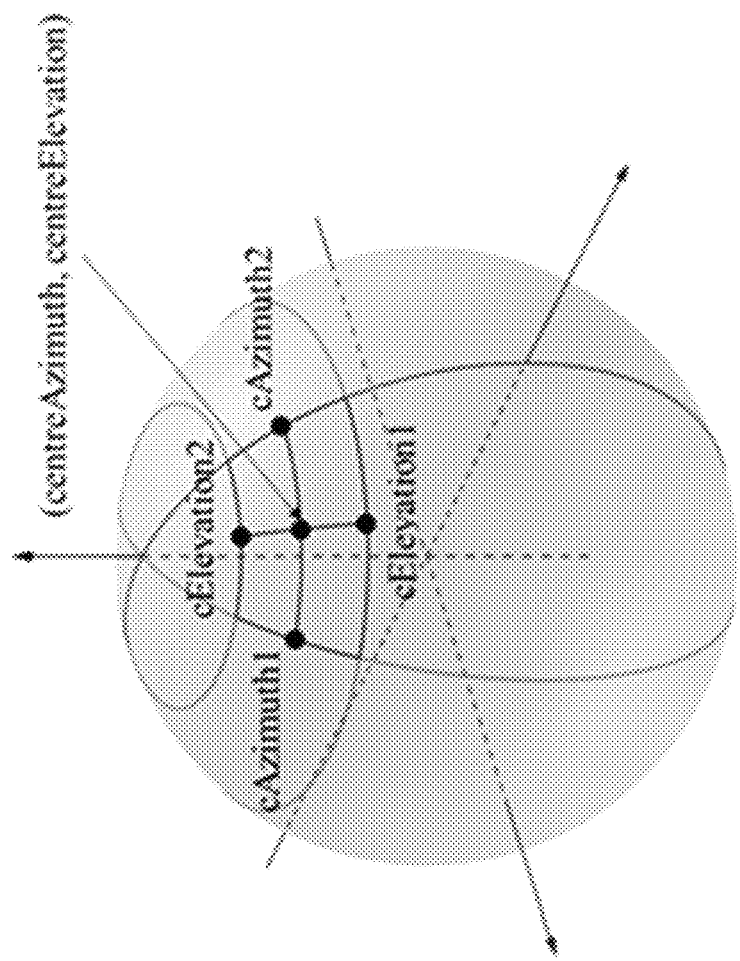

When the shape type value is equal to 1, the sphere region is specified by two azimuth circles and two elevation circles defined by four points cAzimuth1, cAzimuth2, cElevation1, cElevation2 and the centre point defined by centreAzimuth and centreElevation and as shown in FIG. 5B.

When centre_tilt is not equal to 0, the sphere region is firstly derived as above and then a tilt rotation is applied along the axis originating from the sphere origin passing through the centre point of the sphere region, where the angle value increases clockwise when looking from the origin towards the positive end of the axis. The final sphere region is the one after applying the tilt rotation.

Shape type value equal to 0 specifies that the sphere region is specified by four great circles as illustrated in FIG. 5A.

Shape type value equal to 1 specifies that the sphere region is specified by two azimuth circles and two elevation circles as illustrated in FIG. 5B.

Shape type values greater than 1 are reserved.

Syntax

```
aligned(8) SphereRegionStruct(range_included_flag, interpolate_included_flag)
{
  signed int(32) centre_azimuth;
  signed int(32) centre_elevation;
  signed int(32) centre_tilt;
  if (range_included_flag) {
    unsigned int(32) azimuth_range;
    unsigned int(32) elevation_range;
  }
  if (interpolate_included_flag) {
    unsigned int(1) interpolate;
    bit(7) reserved = 0;
  }
}
```

Semantics centre_azimuth and centre_elevation specify the centre of the sphere region. centre_azimuth shall be in the range of $-180*2^{16}$ to $180*2^{16}-1$, inclusive. centre_elevation shall be in the range of $-90*2^{16}$ to $90*2^{16}$, inclusive.

centre_tilt specifies the tilt angle of the sphere region. centre_tilt shall be in the range of $-180*2^{16}$ to $180*2^{16}-1$, inclusive.

azimuth_range and elevation_range, when present, specify the azimuth and elevation ranges, respectively, of the sphere region specified by this structure in units of $2^{-16}$ degrees. azimuth_range and elevation_range specify the range through the centre point of the sphere region, as illustrated by FIG. 5A or FIG. 5B. When azimuth_range and elevation_range are not present in this instance of SphereRegionStruct, they are inferred as specified in the semantics of the structure containing this instance of SphereRegionStruct. azimuth_range shall be in the range of 0 to $360*2^{16}$, inclusive. elevation_range shall be in the range of 0 to $180*2^{16}$, inclusive.

The semantics of interpolate are specified by the semantics of the structure containing this instance of SphereRegionStruct. When interpolate is not present in this instance of SphereRegionStruct, it is inferred as specified in the semantics of the syntax structure containing this instance of SphereRegionStruct.

As described above, N19786 specifies encapsulation, signaling, and streaming of omnidirectional media in a media streaming system. In particular, N19786 specifies how to encapsulate, signal, and stream omnidirectional media using dynamic adaptive streaming over Hypertext Transfer Protocol (HTTP) (DASH). DASH is described in ISO/IEC: ISO/IEC 23009-1:2014, "Information technology Dynamic adaptive streaming over HTTP (DASH) Part 1: Media presentation description and segment formats," International Organization for Standardization, 2nd Edition, May 15, 2014 (hereinafter, "ISO/IEC 23009-1:2014"), which is incorporated by reference herein. A DASH media presentation may include data segments, video segments, and audio segments. In some examples, a DASH Media Presentation may correspond to a linear service or part of a linear service of a given duration defined by a service provider (e.g., a single TV program, or the set of contiguous linear TV programs over a period of time). According to DASH, a Media Presentation Description (MPD) is a document that includes metadata required by a DASH Client to construct appropriate HTTP-URLs to access segments and to provide the streaming service to the user. A MPD document fragment may include a set of eXtensible Markup Language (XML)-encoded metadata fragments. The contents of the MPD provide the resource identifiers for segments and the context for the identified resources within the Media Presentation. The data structure and semantics of the MPD fragment are described with respect to ISO/IEC 23009-1:2014. Further, it should be noted that draft editions of ISO/IEC 23009-1 are currently being proposed. Thus, as used herein, a MPD may include a MPD as described in ISO/IEC 23009-1:2014, currently proposed MPDs, and/or combinations thereof. In ISO/IEC 23009-1:2014, a media presentation as described in a MPD may include a sequence of one or more Periods, where each Period may include one or more Adaptation Sets. It should be noted that in the case where an Adaptation Set includes multiple media content components, then each media content component may be described individually. Each Adaptation Set may include one or more Representations. In ISO/IEC 23009-1:2014 each Representation is provided: (1) as a single Segment, where Subsegments are aligned across Representations with an Adaptation Set; and (2) as a sequence of Segments where each Segment is addressable by a template-generated Universal Resource Locator (URL). The properties of each media content component may be described by an AdaptationSet element and/or elements within an Adaption Set, including for example, a ContentComponent element. It should be noted that the sphere region structure forms the basis of DASH descriptor signaling for various descriptors.

N19786 provides definitions for a number of XML elements and attributes. These XML elements are defined in a separate namespace "urn:mpeg:mpegI:omaf:2018". These are defined in normative schema documents in each clause of N19786 where a new MPD descriptor(s), element(s) or attribute(s) are specified. The namespace designator "xs:" shall correspond to namespace http://www.w3.org/2001/XMLSchema as defined in XML Schema Part 1 [XMLS]. Items in the "Data type" column of Tables use datatypes defined in XML Schema Part 2 [XMLD] and shall have the meaning as defined in [XMLD]. N19786 does not provide an XML schema for a content component attribute for a representation. Signaling a content component attribute for a representation at the DASH level may be useful.

ISO/IEC JTC1/SC29/WG11 MDS21190_WG03_N00474 "Text of ISO/IEC DIS 23090-2 3rd edition Omnidirectional Media Format," 2022 Feb. 15, is incorporated by reference and referred to herein as 21190 is an update to N19786 and similarly defines a media application format that enables omnidirectional media applications It should be noted that 21190 an XML schema for a content component attribute for a representation has been proposed for 21190. However, the proposed XML schema for a content component attribute for a representation is less than ideal at least in that the proposed data type is an unsigned integer and as such does not provide sufficient signaling for content components. This is because a single unsigned integer data type cannot represent multiple track_ID values that a content Component attribute specifies. This disclosure describes techniques for signaling a content component attribute for a representation.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 6:
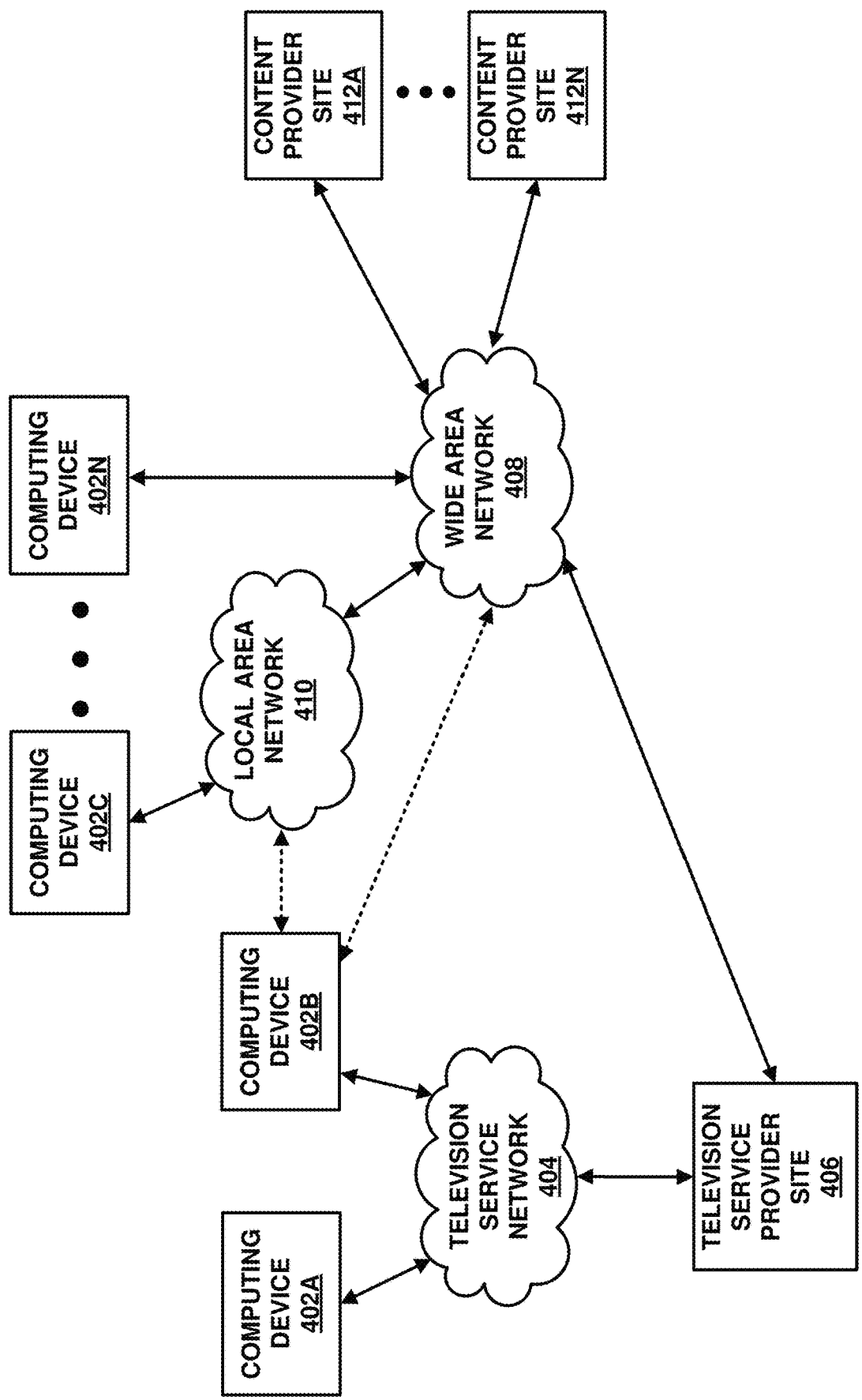
FIG. 6 is a conceptual drawing illustrating an example of components that may be included in an implementation of a system that may be configured to transmit coded video data according to one or more techniques of this disclosure.

FIG. 6 is a conceptual drawing illustrating an example of components that may be included in an implementation of system 100. In the example implementation illustrated in FIG. 6, system 100 includes one or more computing devices 402A-402N, television service network 404, television service provider site 406, wide area network 408, local area network 410, and one or more content provider sites 412A-412N. The implementation illustrated in FIG. 6 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 6, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 6, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 9, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3$^{rd}$ Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 480 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 6, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. It should be noted that the term conforming bitstream may be used in place of the term compliant bitstream. It should be noted that data encapsulator 107 need not necessary be located in the same physical device as video encoder 106. For example, functions described as being performed by video encoder 106 and data encapsulator 107 may be distributed among devices illustrated in FIG. 6.

Figure 7:
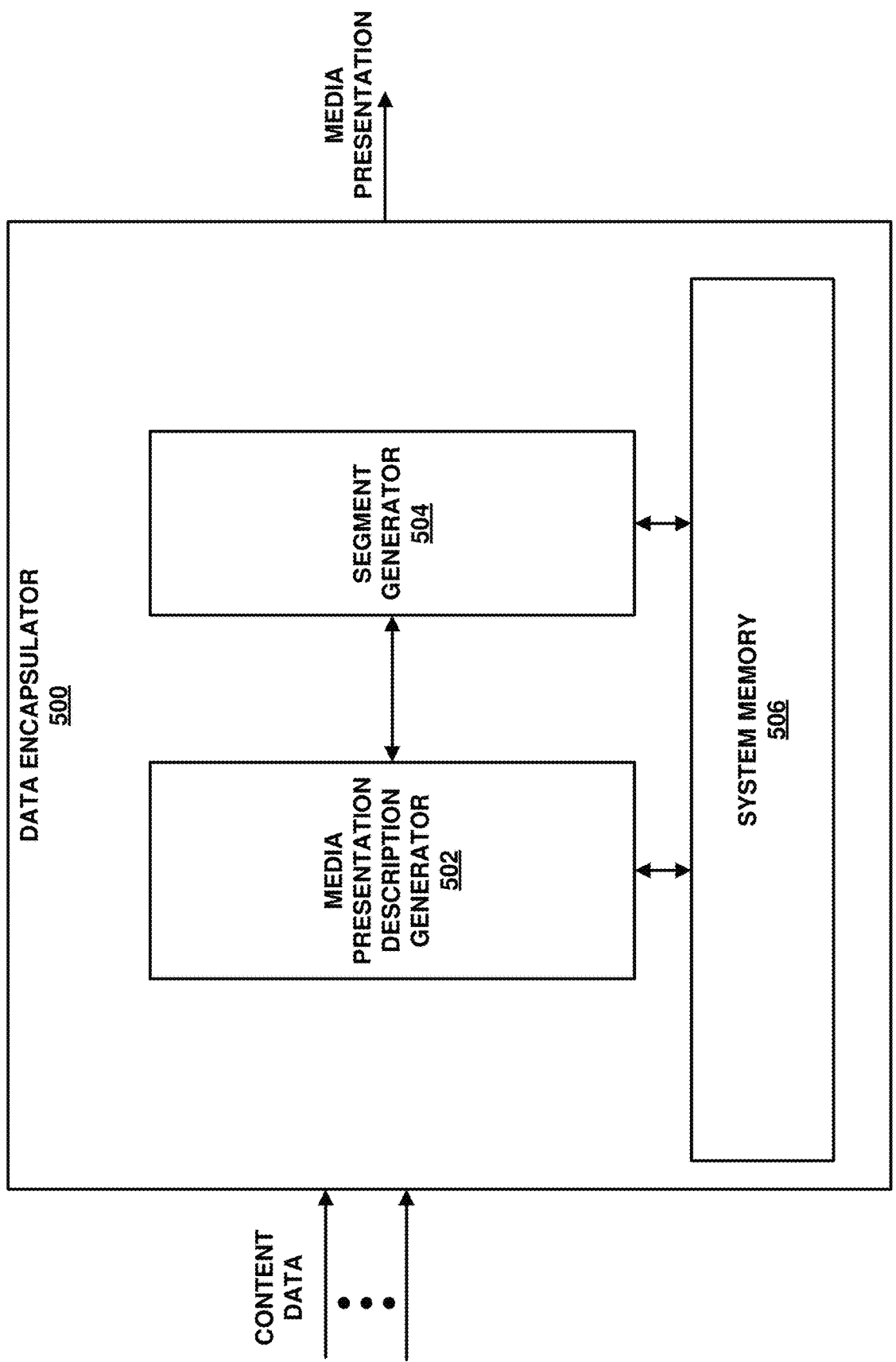
FIG. 7 is a block diagram illustrating an example of a data encapsulator that may implement one or more techniques of this disclosure.

In one example, data encapsulator 107 may include a data encapsulator configured to receive one or more media components and generate media presentation based on DASH. FIG. 7 is a block diagram illustrating an example of a data encapsulator that may implement one or more techniques of this disclosure. Data encapsulator 500 may be configured to generate a media presentation according to the techniques described herein. In the example illustrated in FIG. 7, functional blocks of component encapsulator 500 correspond to functional blocks for generating a media presentation (e.g., a DASH media presentation). As illustrated in FIG. 7, component encapsulator 500 includes media presentation description generator 502, segment generator 504, and system memory 506. Each of media presentation description generator 502, segment generator 504, and system memory 506 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although data encapsulator 500 is illustrated as having distinct functional blocks, such an illustration is for descriptive purposes and does not limit data encapsulator 500 to a particular hardware architecture. Functions of data encapsulator 500 may be realized using any combination of hardware, firmware and/or software implementations.

Media presentation description generator 502 may be configured to generate media presentation description fragments. Segment generator 504 may be configured to receive media components and generate one or more segments for inclusion in a media presentation. System memory 506 may be described as a non-transitory or tangible computer-readable storage medium. In some examples, system memory 506 may provide temporary and/or long-term storage. In some examples, system memory 506 or portions thereof may be described as non-volatile memory and in other examples portions of system memory 506 may be described as volatile memory. System memory 506 may be configured to store information that may be used by data encapsulator during operation.

As described above, the proposed XML schema for a content component attribute for a representation provided for 21190 is less than ideal. In one example, according to the techniques herein, a content component attribute for a representation may have a data type of a list of unsigned integers. This allows, completely specifying track_ID values which use 32 bits. That is, in one example, data encapsulator 107 may be configured to use the following with respect to signaling of a content component attribute of a representation in a DASH MPD:

A Representation element may be extended by the omaf2:@contentComponent attribute as specified in this subclause. Table 1 specifies the semantics of the omaf2:@contentComponent attribute.

TABLE 1

| Attribute | Use | Data Type | Description |
| --- | --- | --- | --- |
| omaf2:@contentComponent | O | omaf2:listofUnsignedInt | When present, specifies the set of all media content components that are contained in this Representation as a whitespace-separated list of their track_ID values |

The attribute shall be as defined in the following a XML schema:

```
<?xml version="1.0" encoding="UTF-8"?>
<xs:schema xmlns:xs="http://www.w3.org/2001/XMLSchema"
    targetNamespace="urn:mpeg:mpegI:omaf:2020"
  xmlns:omaf2="urn:mpeg:mpegI:omaf:2020"
    attributeFormDefault="qualified">
    <xs:simpleType name="listOfUnsignedInt">
      <xs:restriction>
        <xs:simpleType>
          <xs:list itemType="xs:unsignedInt"/>
        </xs:simpleType>
        <xs:minLength value="1"/>
      </xs:restriction>
    </xs:simpleType>
    <xs:attribute name="contentComponent" type="omaf2:listOfUnsignedInt"/>
</xs:schema>
```

In this manner, data encapsulator 107 represents an example of a device configured to signal an attribute specifying a set of media content components that are contained in a representation, wherein the attribute is a list of unsigned integers corresponding to a list of track identifier values.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I$^2$C, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I$^2$C, or any other logical and physical structure that may be used to interconnect peer devices. Data decapsulator 123 may be configured to receive a bitstream generated by data encapsulator 107 and perform sub-bitstream extraction according to one or more of the techniques described herein.

Video decoder 124 may include any device configured to receive a bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. Display 126 may include a stereoscopic display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein. Destination device 120 may include a receive device.

Figure 8:
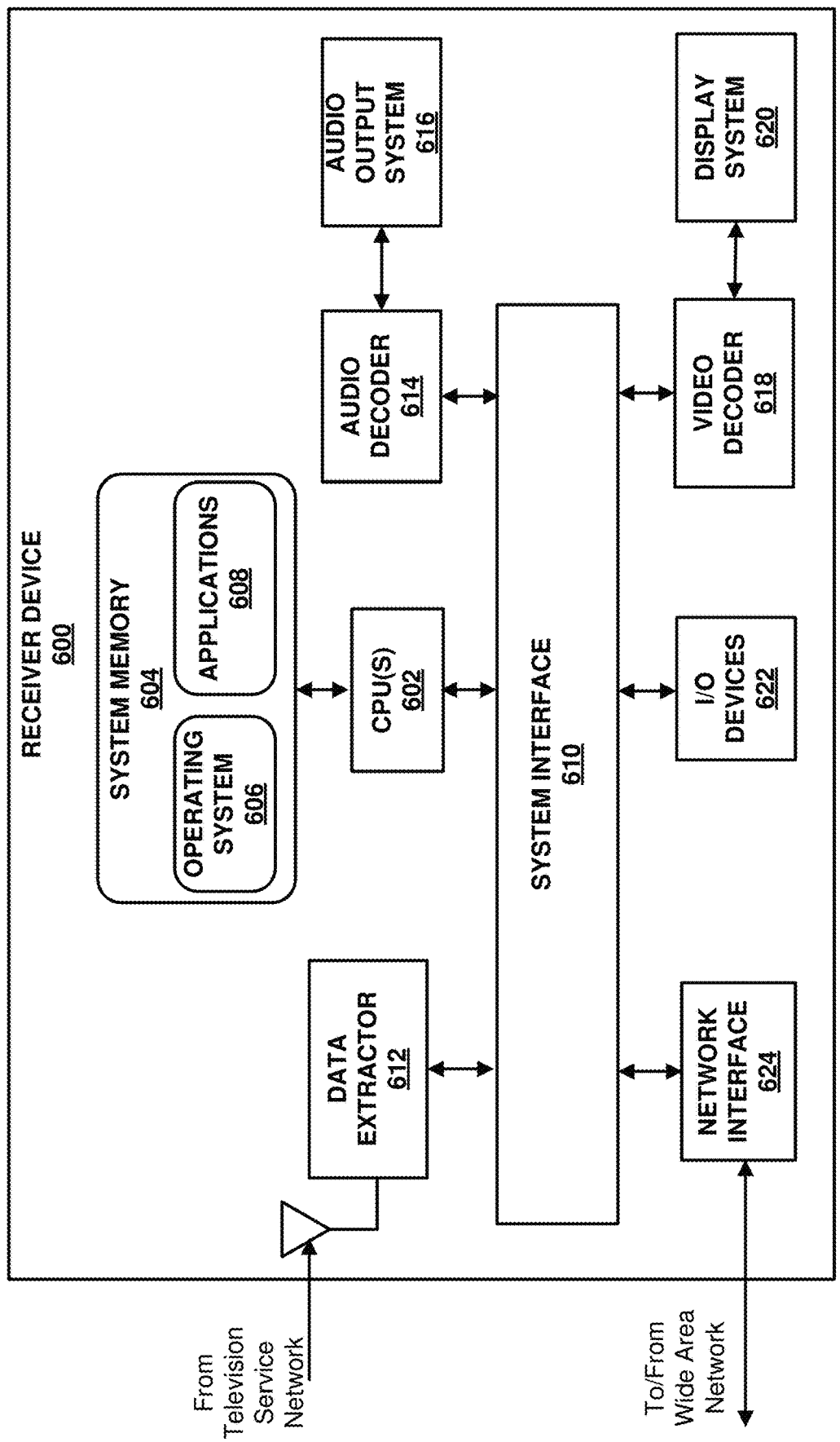
FIG. 8 is a block diagram illustrating an example of a receiver device that may implement one or more techniques of this disclosure.

FIG. 8 is a block diagram illustrating an example of a receiver device that may implement one or more techniques of this disclosure. That is, receiver device 600 may be configured to parse a signal based on the semantics described above. Receiver device 600 is an example of a computing device that may be configured to receive data from a communications network and allow a user to access multimedia content, including a virtual reality application. In the example illustrated in FIG. 8, receiver device 600 is configured to receive data via a television network, such as, for example, television service network 404 described above. Further, in the example illustrated in FIG. 8, receiver device 600 is configured to send and receive data via a wide area network. It should be noted that in other examples, receiver device 600 may be configured to simply receive data through a television service network 404. The techniques described herein may be utilized by devices configured to communicate using any and all combinations of communications networks.

As illustrated in FIG. 8, receiver device 600 includes central processing unit(s) 602, system memory 604, system interface 610, data extractor 612, audio decoder 614, audio output system 616, video decoder 618, display system 620, I/O device(s) 622, and network interface 624. As illustrated in FIG. 8, system memory 604 includes operating system 606 and applications 608. Each of central processing unit(s) 602, system memory 604, system interface 610, data extractor 612, audio decoder 614, audio output system 616, video decoder 618, display system 620, I/O device(s) 622, and network interface 624 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 600 is illustrated as having distinct functional blocks, such an illustration is for descriptive purposes and does not limit receiver device 600 to a particular hardware architecture. Functions of receiver device 600 may be realized using any combination of hardware, firmware and/or software implementations.

CPU(s) 602 may be configured to implement functionality and/or process instructions for execution in receiver device 600. CPU(s) 602 may include single and/or multi-core central processing units. CPU(s) 602 may be capable of retrieving and processing instructions, code, and/or data structures for implementing one or more of the techniques described herein. Instructions may be stored on a computer readable medium, such as system memory 604.

System memory 604 may be described as a non-transitory or tangible computer-readable storage medium. In some examples, system memory 604 may provide temporary and/or long-term storage. In some examples, system memory 604 or portions thereof may be described as non-volatile memory and in other examples portions of system memory 604 may be described as volatile memory. System memory 604 may be configured to store information that may be used by receiver device 600 during operation. System memory 604 may be used to store program instructions for execution by CPU(s) 602 and may be used by programs running on receiver device 600 to temporarily store information during program execution. Further, in the example where receiver device 600 is included as part of a digital video recorder, system memory 604 may be configured to store numerous video files.

Applications 608 may include applications implemented within or executed by receiver device 600 and may be implemented or contained within, operable by, executed by, and/or be operatively/communicatively coupled to components of receiver device 600. Applications 608 may include instructions that may cause CPU(s) 602 of receiver device 600 to perform particular functions. Applications 608 may include algorithms which are expressed in computer programming statements, such as, for-loops, while-loops, if-statements, do-loops, etc. Applications 608 may be developed using a specified programming language. Examples of programming languages include, Java™, Jini™, C, C++, Objective C, Swift, Perl, Python, PhP, UNIX Shell, Visual Basic, and Visual Basic Script. In the example where receiver device 600 includes a smart television, applications may be developed by a television manufacturer or a broadcaster. As illustrated in FIG. 8, applications 608 may execute in conjunction with operating system 606. That is, operating system 606 may be configured to facilitate the interaction of applications 608 with CPUs(s) 602, and other hardware components of receiver device 600. Operating system 606 may be an operating system designed to be installed on set-top boxes, digital video recorders, televisions, and the like. It should be noted that techniques described herein may be utilized by devices configured to operate using any and all combinations of software architectures.

System interface 610 may be configured to enable communications between components of receiver device 600. In one example, system interface 610 comprises structures that enable data to be transferred from one peer device to another peer device or to a storage medium. For example, system interface 610 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 600 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 8, data extractor 612 may be configured to extract video, audio, and data from a signal. A signal may be defined according to, for example, aspects DVB standards, ATSC standards, ISDB standards, DTMB standards, DMB standards, and DOCSIS standards.

Data extractor 612 may be configured to extract video, audio, and data, from a signal. That is, data extractor 612 may operate in a reciprocal manner to a service distribution engine. Further, data extractor 612 may be configured to parse link layer packets based on any combination of one or more of the structures described above.

Data packets may be processed by CPU(s) 602, audio decoder 614, and video decoder 618. Audio decoder 614 may be configured to receive and process audio packets. For example, audio decoder 614 may include a combination of hardware and software configured to implement aspects of an audio codec. That is, audio decoder 614 may be configured to receive audio packets and provide audio data to audio output system 616 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3) formats. Audio output system 616 may be configured to render audio data. For example, audio output system 616 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 618 may be configured to receive and process video packets. For example, video decoder 618 may include a combination of hardware and software used to implement aspects of a video codec. In one example, video decoder 618 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), High-Efficiency Video Coding (HEVC) and Versatile Video Coding (VVC). Display system 620 may be configured to retrieve and process video data for display. For example, display system 620 may receive pixel data from video decoder 618 and output data for visual presentation. Further, display system 620 may be configured to output graphics in conjunction with video data, e.g., graphical user interfaces. Display system 620 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 622 may be configured to receive input and provide output during operation of receiver device 600. That is, I/O device(s) 622 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 622 may be operatively coupled to receiver device 600 using a standardized communication protocol, such as for example, Universal Serial Bus protocol (USB), Bluetooth, ZigBee or a proprietary communications protocol, such as, for example, a proprietary infrared communications protocol.

Network interface 624 may be configured to enable receiver device 600 to send and receive data via a local area network and/or a wide area network. Network interface 624 may include a network interface card, such as an Ethernet card, an optical transceiver, a radio frequency transceiver, or any other type of device configured to send and receive information. Network interface 624 may be configured to perform physical signaling, addressing, and channel access control according to the physical and Media Access Control (MAC) layers utilized in a network. Receiver device 600 may be configured to parse a signal generated according to any of the techniques described above with respect to FIG. 8. In this manner, receiver device 600 represents an example of a device configured to parse an attribute specifying a set of media content components that are contained in a representation, wherein the attribute is a list of unsigned integers corresponding to a list of track identifier values.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

A method of signaling information associated with an omnidirectional video according to an aspect of the present invention includes: signaling an attribute specifying a set of media content components that are contained in a representation, wherein the attribute is a list of unsigned integers corresponding to a list of track identifier values.

A method of providing omnidirectional video according to an aspect of the present invention includes: parsing an attribute specifying a set of media content components that are contained in a representation, wherein the attribute is a list of unsigned integers corresponding to a list of track identifier values.

Various examples have been described. These and other examples are within the scope of the following claims.

What is claimed is:

1. A device comprising one or more processors configured to:
   receive a representation element in a Media Presentation Description (MPD) document, wherein the representation element is an eXtensible Markup Language (XML)-encoded metadata fragment; and
   parse a contentComponent attribute in the representation element,
   wherein the contentComponent attribute, when present, specifies a set of all media content components that are contained in the representation element as a whitespace-separated list of track identifier values, track_ID, and
   a data type of the contentComponent attribute is a list of unsigned integers.

2. A device of signaling information associated with an omnidirectional video, the device comprising:
   a processor; and
   a memory associated with the processor, wherein the processor is configured to:
   signal a representation element in a Media Presentation Description (MPD) document, wherein the representation element is an extensible Markup Language (XML)-encoded metadata fragment,
   wherein the representation element includes a contentComponent attribute, which when present, specifies a set of all media content components that are contained in the representation element as a whitespace-separated list of track identifier values, track_ID, and
   a data type of the contentComponent attribute is a list of unsigned integers.

3. A method of providing omnidirectional video, the method comprising:
   receiving a representation element in a Media Presentation Description (MPD) document, wherein the representation element is an extensible Markup Language (XML)-encoded metadata fragment; and
   parsing a contentComponent attribute in the representation element, wherein the contentComponent attribute, when present, specifies a set of all media content components that are contained in the representation element as a whitespace-separated list of track identifier values, track_ID, and
a data type of the contentComponent attribute is a list of unsigned integers.

\* \* \* \* \*